US010080984B2

United States Patent
Eberle et al.

(10) Patent No.: US 10,080,984 B2
(45) Date of Patent: Sep. 25, 2018

(54) FILTER DEVICE

(71) Applicant: HYDAC FLUIDCARECENTER GMBH, Sulzbach/Saar (DE)

(72) Inventors: Richard Eberle, Ormesheim (DE); Micha Kreibig, Merzig-Brotdorf (DE)

(73) Assignee: HYDAC FLUIDCARECENTER GMBH, Sulzbach/Saar (DE)

( * ) Notice: Subject to any disclaimer, the term of this patent is extended or adjusted under 35 U.S.C. 154(b) by 47 days.

(21) Appl. No.: 15/310,889

(22) PCT Filed: Apr. 18, 2015

(86) PCT No.: PCT/EP2015/000821
§ 371 (c)(1),
(2) Date: Nov. 14, 2016

(87) PCT Pub. No.: WO2015/176791
PCT Pub. Date: Nov. 26, 2015

(65) Prior Publication Data
US 2017/0087490 A1    Mar. 30, 2017

(30) Foreign Application Priority Data
May 17, 2014    (DE) .................... 10 2014 007 302

(51) Int. Cl.
*B01D 36/00*    (2006.01)
*B01D 29/15*    (2006.01)
(Continued)

(52) U.S. Cl.
CPC ........... *B01D 35/153* (2013.01); *B01D 29/15* (2013.01); *B01D 29/21* (2013.01); *B01D 35/16* (2013.01);
(Continued)

(58) Field of Classification Search
CPC ...... B01D 35/153; B01D 29/15; B01D 29/21; B01D 36/001; B01D 35/16;
(Continued)

(56) References Cited

U.S. PATENT DOCUMENTS

| 2008/0116126 A1 | 5/2008 | Greiving et al. |
| 2011/0036770 A1* | 2/2011 | Jokschas ................ B01D 29/21 |
| | | 210/440 |

FOREIGN PATENT DOCUMENTS

| DE | 195 38 883 | 4/1997 |
| DE | 197 16 085 | 10/1998 |

(Continued)

OTHER PUBLICATIONS

International Search Report (ISR) dated Jul. 14, 2015 in International (PCT) Application No. PCT/EP2015/000821.

*Primary Examiner* — Madeline Gonzalez
(74) *Attorney, Agent, or Firm* — Wenderoth, Lind & Ponack, L.L.P.

(57) ABSTRACT

A filter device for filtering fluids such as fuels, including diesel fuel, has a filter housing (1), within which a filter element (17) can be fastened and exchanged. The filter element has a filter medium that surrounds an inner filter cavity (25). A fluid inlet leads to the unfiltered side (27) of the filter element (17). A fluid outlet outflows filtered fluid from the filtered side (25). An equalizing tube (49) extends in the filter housing (1) up to a maximum filling level height for the filtration operation. The equalizing tube is connected to a tank return connection at a lower end of the equalizing tube and is open at an upper end (51) of the equalizing tube. The tube (49) has, at distances from the upper and lower ends of the tube, an inner control part (60) with a passage opening (61) forming a throttle point.

11 Claims, 2 Drawing Sheets

(51) Int. Cl.
  *B01D 35/153* (2006.01)
  *B01D 35/16* (2006.01)
  *B01D 29/21* (2006.01)
(52) U.S. Cl.
  CPC ...... *B01D 36/001* (2013.01); *B01D 2201/291* (2013.01); *B01D 2201/305* (2013.01); *B01D 2201/316* (2013.01)
(58) Field of Classification Search
  CPC ........ B01D 2201/291; B01D 2201/316; B01D 2201/305
  USPC ........................................ 210/435, 437, 438
  See application file for complete search history.

(56) References Cited

FOREIGN PATENT DOCUMENTS

| | | |
|---|---|---|
| DE | 20 2006 017614 | 4/2008 |
| WO | 2014/191476 | 12/2014 |

\* cited by examiner

FILTER DEVICE

FIELD OF THE INVENTION

The invention relates to a filter device for filtering fluids, such as fuels, including diesel fuel, comprising a filter housing, inside which a filter element can be fastened in an exchangeable manner. The filter element has a filter medium that surrounds an inner filter cavity. A fluid inlet leads to the unfiltered side of the filter element. A fluid outlet is for the outflow of filtered fluid from the filtered side. The invention further relates to a filter element intended for use in such a filter device.

BACKGROUND OF THE INVENTION

Filter devices of the type described above are state of the art. They are used, for example, in fuel systems for internal combustion engines to protect sensitive components, in particular injection systems, from damage caused by pollutants carried in the fuel, such as dirt particles or water content that is to be separated at the filter element. High standards must be demanded with regards to the reliable functioning of such filter devices because the operation of such systems with a non-operable filter device would lead to significant economic losses due to the malfunctions or damage to injection systems that it would cause.

SUMMARY OF THE INVENTION

An object of the invention is to provide an improved filter device, with particularly reliable operating behavior.

A significant special feature of the invention is that an equalizing tube is provided in the filter housing. The equalizing tube extends from its bottom end connected to the tank return connection up to a maximum filling level height provided for the filtration operation, with the tube being open at its top end and having, at a point located at a distance from the top and bottom ends of the tube, an inner control part. In the inner control part, a passage opening is located and forms a throttle point. When the size of the passage opening, in particular in the form of a through-hole, which is located in the control part, is appropriately selected, a pressure-relieving ventilation of the filter housing in the direction of the tank return is produced by the equalizing tube. At the same time, the desired feed pressure is maintained due to the throttling effect in normal operation. A safety device is then created that both prevents breakdowns caused by poor housing ventilation and that can also relieve pressure in the filter housing via the throttle point.

The control part, which forms a kind of closure part, is preferably disposed in the central longitudinal area or in the vicinity of this longitudinal area of the tube.

In preferred exemplary embodiments, in which the filter element can be fastened via at least one end cap on an element seat of the filter housing, the equalizing tube is mounted on the filter housing inside the element seat and extends coaxial to the longitudinal axis of the filter element located in the functional position through the end cap thereof fastened to the filter seat and through the filter cavity. That arrangement of the equalizing tube concentric to the longitudinal axis results in a particularly compact construction of the filter device.

In advantageous exemplary embodiments, the external diameter and the internal diameter of the tube can have a stepped design, with the tube abutting the element seat by the longitudinal section of the larger external diameter and of the larger internal diameter. The control part comprises the through-hole forming the transition between the larger internal diameter and the smaller internal diameter of the tube.

The top end cap of the filter element may particularly advantageously have a tube connection projecting into the inner filter cavity, through which the top end area of the tube extends in the functional position of the filter element.

Advantageously, sealing packing is provided inside the tube connection of the top end cap. The sealing packing is penetrated in the functional position by the tube and forms a sealing connection with the tube. The sealing connection seals the inner filter cavity relative to the housing inner side. In a filter device, in which the filter element is flowed through in the filtration operation from its outside to the filter cavity forming the filtered side, the seal between the unfiltered side on the housing inner side and the filtered side is automatically created when the filter element is placed in the functional position.

Particularly advantageously, a fluid path leading from the unfiltered side to the tank return connection and a blocking device are provided in the filter housing. The blocking device blocks this fluid path when a filter element is inserted into the housing and unblocks this fluid path when the filter element is removed. A bypass is then formed as an additional safety device in the feed line, which leads from a respective tank via a feed pump and the filter housing to the consumer (such as an injection system). The bypass is closed by the blocking device as a function of the presence of a filter element inserted into the filter housing, but is automatically opened in the absence of the filter element. The absence of a filter element and the thus effected opening of the bypass via the tank return connection to the non-pressurized tank leads to an interruption of the feed flow to the consumer and eliminates the risk of operation taking place when the filter element has inadvertently not been inserted into the filter housing. With regards to the design of the blocking device, particularly advantageously the blocking device has an annular body, which projects at the bottom end cap of the filter element and surrounds, on this end cap, the outlet aperture from the filter cavity forming the filtered side. The annular body engages in a sealing manner in an annular gap when the filter element is inserted, which annular gap is formed on the element seat of the housing and is in fluid connection with the tank return connection.

In particularly preferred exemplary embodiments, a barrier device can be formed as an additional safety device in the filter housing between the fluid outlet and the filtered side of the filter element. The barrier device allows an influx of fluid to the fluid outlet only upon reaching a predetermined filling level in the housing by overflowing of the barrier device. This arrangement eliminates the risk that, in the absence of a filter element and in spite of the then opened bypass, fuel supplied to the housing via the fluid inlet can reach the fluid outlet, because the barrier device can be overflowed only when a predetermined filling level height is reached. That filling level cannot be reached when the bypass is opened, even if fuel is still being supplied.

The barrier device can particularly advantageously have a tubular body, which projects from the element seat into the inner filter cavity of the inserted filter element up to the predetermined filling level height and is connected inside the element seat to the fluid outlet.

The subject matter of the invention is also a filter element intended for use in the filter device.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
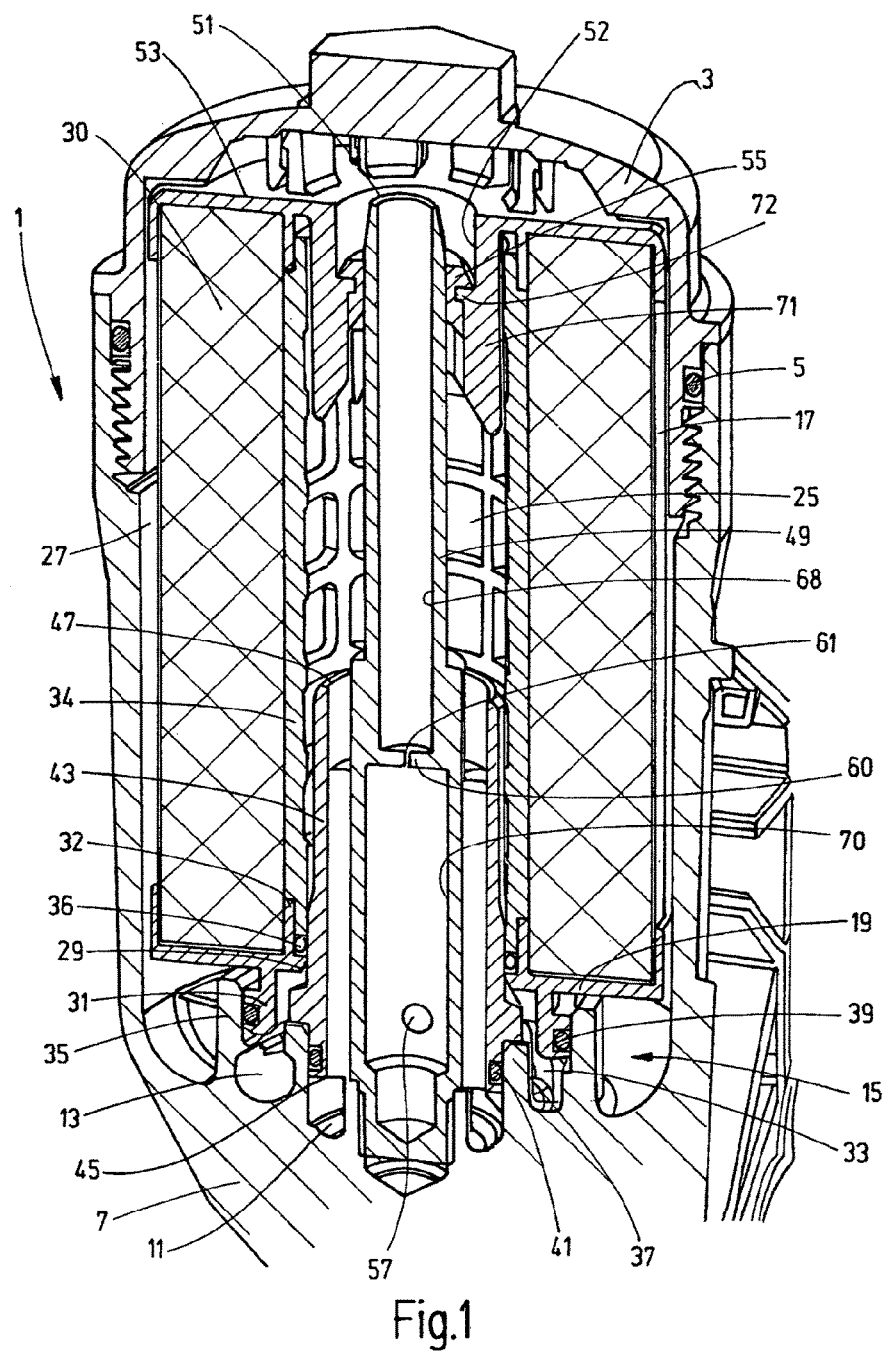
FIG. 1 is a perspective view of a filter device according to an exemplary embodiment of the invention, depicted cut-open and partially broken away, with a filter element inserted into the filter housing.

The invention is explained below using the example of a fuel filter, which is provided in a fuel supply system (not shown) of an internal combustion engine for the cleaning of diesel oil. The invention is also suitable for other fluids as well as for other applications.

The device has a filter housing 1 in the form of a hollow cylindrical pot, which can be closed in a tight manner at its top open end by a removable screw-on lid 3 with the assistance of a sealing element 5. The housing 1 has a bottom part 7, which is closed as far as housing connections, which are not visible in the figures. The housing connections are an outlet connection for the discharge of cleaned diesel oil and a tank return connection. The outlet connection is connected to an outlet chamber 11. The tank return connection is in fluid connection with a return chamber 13. The outlet and return chambers are formed in the bottom part 7 in that area forming an element seat 15, in which a filter element 17 inserted into the housing 1 can be fastened by its bottom end cap 19. The filter element is depicted in the installed state in FIG. 1.

During operation, diesel oil is conveyed inside the not depicted fuel supply system by a feed pump from a tank to the fluid inlet of the filter housing 1. The fluid inlet, not visible in the drawings, is located on the housing 1 above the bottom part 7 and approximately at half the height of the filter housing. The inflowing fuel flows through the inserted filter element 17 from the outer unfiltered side 27 on the outside inwards to an inner filter cavity 25, which forms the filtered side in the filtration operation. As can be seen from FIG. 1, the bottom end cap 19 of the filter element 17 in the figure has an axially and downwardly projecting annular body 31 that is coaxial to the central opening 29 of the inner filter cavity 25. The annular body 31 surrounds the opening 29 at a radial distance and forms, in cooperation with the element seat 15, a blocking device. For this purpose, the element seat 15 forms an annular gap 33 forming the inlet part of the return chamber 13, which annular gap 33 is delimited on the outside by a tube connection 35 projecting from the element seat 15 and on the inside by an annular rib 37 that has a somewhat smaller projection. A sealing element 39 lying radially on the outside of the annular body 31 forms a seal on the outer side of the annular gap 33, while a sealing element 41 forms a seal on the inner side of the annular rib 37.

Figure 2:
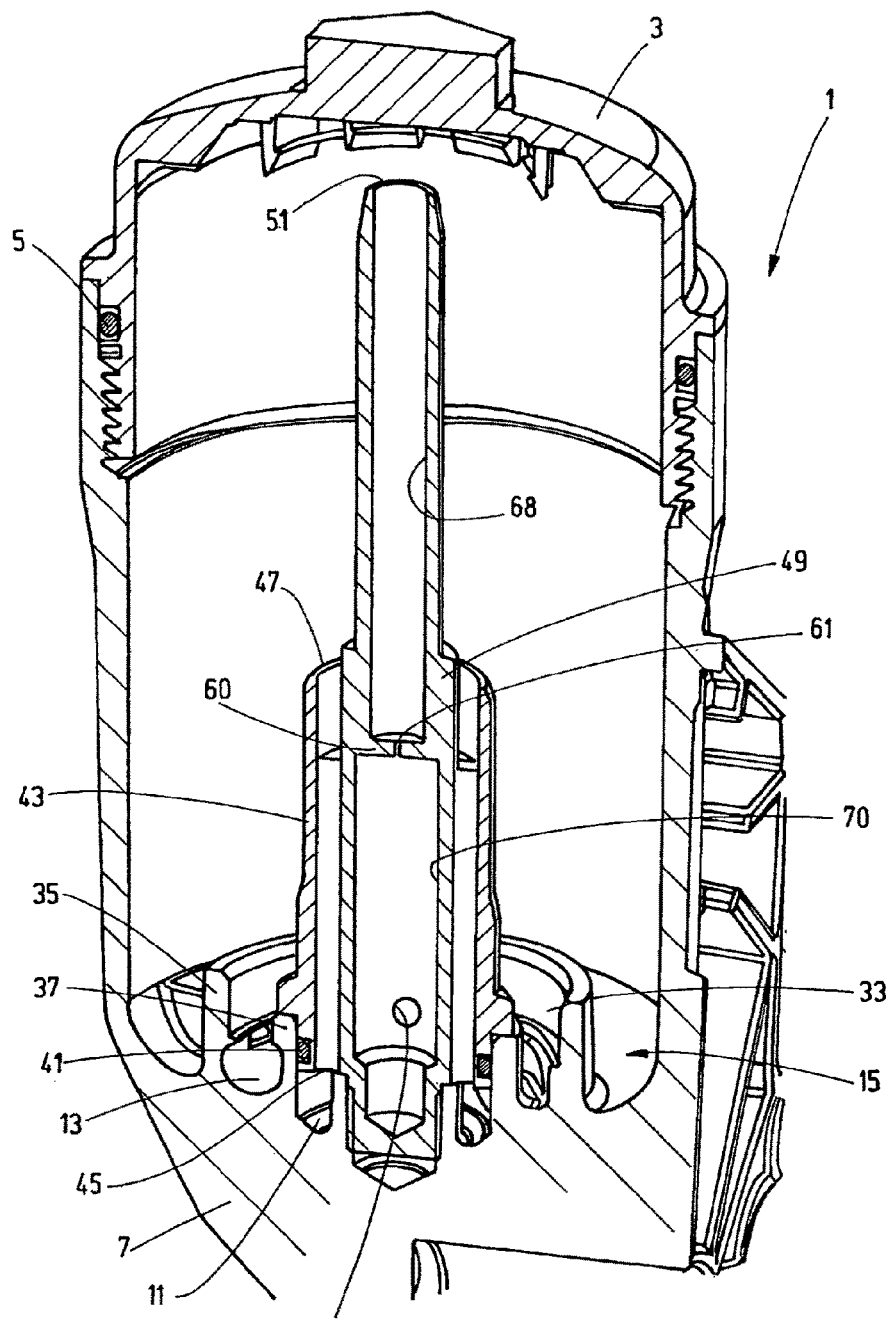
FIG. 2 is a perspective oblique view of the filter device of FIG. 1, depicted cut-open and partially broken away, without a filter element in the filter housing.

The remaining design features of the element seat 15 are clearly evident in FIG. 2. A tubular body 43 serving as a barrier device extends from the element seat 15 concentric to the longitudinal axis of the device through the passage 29 of the end cap 19 axially into the inner filter cavity 25 of the filter element 17 inserted into the housing 1. The end cap 19 has a tube piece 32 surrounding the passage 29, which tube piece extends axially upwards and forms a bearing surface for the bottom end of the fluid-penetrable support tube 34 of the filter element 17. A sealing element 36 forms on the tube piece 32 a seal of the passage 29 relative to the outer side of the tubular body 43. That tubular body is open to the outlet chamber 11 as can be seen in FIG. 1. By the top open tube end 47, the tubular body 43 opens at approximately half the height of the filter housing 1 in the inner filter cavity 25 of the inserted filter element 17, i.e., the filtered side in the filtration operation. When there is a normal filling level in a filtration operation with an inserted filter element 17, the fuel flowing through the filter element 17 from the outside to the inside overflows the tube end 47 of the tubular body 43. Cleaned fuel then flows into the outlet chamber 11 and exits the filter housing 1 via the fluid outlet connection (not shown).

If, as is shown in FIG. 2, no filter element 17 is located in the housing 1 and thus no blocking device is acting in the annular gap 33 because the annular gap 33 is open to the return chamber 13 and then to the tank return, no filling level of fuel can be built up in the housing 1 that could overflow the tube end 47 of the tubular body 43 serving as a barrier device. If the device were operated without an inserted filter element 17, supplied fuel overflowing the tube connection 35 would flow away to the tank via the annular gap 33 and the return chamber 13. No unfiltered fuel could then reach the fluid outlet connection via the outlet chamber 11. Because the annular gap 33 is delimited by the tube connection 35 projecting from the bottom part 7, which must be overflowed, a residual sump remains in this case inside a collection chamber formed on the bottom of the housing 1, in which pollutants that may fall from the outer side of the filter element 17 when it is removed are held and do not return to the tank via the return.

Inside the tubular body 43, an equalizing tube 49 extends from the element seat 15 concentrically to the longitudinal axis through the inner filter cavity 25 of the inserted filter element 17 and so far upwards that its top end 51 lies at the maximum filling level height provided for the filtration operation. The equalizing tube 49 penetrates an opening 52 located on the top end cap 53 of the inserted filter element. This opening is formed by the inner side of a tube connection 71, which tube connection extends from the top end cap 53 of the filter element 17 axially downwards into the filter cavity 25. The inner side of the tube connection 71 has an annular rib 72 projecting radially inwards, by which an elastomer sealing packing 55 is fixed. When the filter element 17 is in the functional position, the equalizing tube 49 penetrates the sealing packing 55 by its top end area and is tapered towards the end 51 to form the seal between the top end of the filter cavity 25 and the housing inner side, i.e., the seal between the filtered side and the unfiltered side 27 located on the outer side of the filter element 17.

While the equalizing tube 49 is open at its top end 51, the bottom end of the equalizing tube 49 is closed up to a channel 57 that extends transverse to the longitudinal axis. Channel 57 connects the inside of the equalizing tube 49 to the return chamber 13. As can be seen from the figures, the equalizing tube 49 is stepped both in its external diameter and in its internal diameter. The bottom area 70 abutting the element seat 15 has a smaller internal diameter than the area 78 above it. The external diameter of the equalizing tube 49 also is different over most of the length of these areas 68, 70, i.e. being smaller in the top part than in the bottom part. At the transition point between the area 68 of smaller internal diameter and the area 70 of larger internal diameter, a control or closing part 60 is located in the tube interior, through which part a passage opening, in particular in the form of a through-hole 61, extends. The control part 60 with the through-hole 61 is located in the central longitudinal area of the equalizing tube 49, more specifically, a little below the center of the tube length. The through-hole 61 is dimensioned such that it forms a throttle point, by which the interior of the filter housing 1, which forms the unfiltered side 27 in the filtration operation, is connected to the tank return connection. The size of the through-hole 61 is selected such that, while a pressure-relieving, automatically acting ventilation device for the filter housing 1 is created by the equalizing tube 49, a desired predetermined feed pressure is nevertheless maintained in normal filtration operation due to the throttling effect of the through-hole 61. Because the throttle point 61 is disposed approximately centrally inside the equalizing tube 49, the flow conditions are improved due to an optimized throttling effect.

While one embodiment has been chosen to illustrate the invention, it will be understood by those skilled in the art that various changes and modifications can be made therein without departing from the scope of the invention as defined in the claims.

The invention claimed is:

1. A filter device, comprising:
   a filter housing having an element seat;
   a filter element releasably and replaceably mounted in said filter housing, said filter element having a filter medium surrounding an inner filter cavity;
   an unfiltered side of said filter element connectable to a fluid inlet;
   an outlet chamber connectable to a fluid outlet and in fluid communication with said inner filter cavity;
   an equalizing tube extending in said filter housing up to a maximum filling level height for the filtration operation, said equalizing tube being connectable at a bottom end thereof to a tank return connection through a return chamber in said filter housing, being open at a top end thereof and extending through said inner filter cavity;
   an inner control part in said equalizing tube at a point located at distances from said top end and said bottom end;
   a through-hole being in said inner control part and forming a throttle point;
   a bottom end cap of said filter element being fastened on said element seat of said filter housing, said equalizing tube being mounted inside said element seat and extending coaxially to a longitudinal axis of said filter element in a functional position of said filter element in said filter housing by said bottom end cap being fastened to said element seat; and
   an external diameter and an internal diameter of said equalizing tube having stepped designs, said equalizing tube abutting said element seat by a longitudinal section of a larger external diameter and a larger internal diameter position of said equalizing tube, said control part with said through-hole forming a transition between a larger internal diameter and a smaller internal diameter of said equalizing tube.

2. A filter device according to claim 1 wherein said control part is disposed in a central longitudinal area of said equalizing tube.

3. A filter device according to claim 1 wherein a top end cap of said filter element comprises a connection tube projecting into said inner filter cavity, said equalizing tube having a top end area extending through said connection tube in the functional position of said filter element.

4. A filter device according to claim 3 wherein a sealing packing is inside said connection tube of said top cap, said sealing packing being penetrated by said equalizing tube in the functional position and forming a sealing connection with said equalizing tube, said sealing connection sealing an said inner filter cavity relative a housing inner side.

5. A filter device according to claim 1 wherein a fluid path leads from an unfiltered side of said filter element to said return chamber connectable to the tank return connection; and
a blocking device is in said filter housing, blocks said fluid path when said filter element is inserted in said filter housing and unblocks said fluid path when said filter element is removed from said filter housing.

6. A filter device according to claim 5 wherein said blocking device comprises an annular body projecting at said bottom end cap of filter element and surrounding on said bottom end cap an outlet aperture from said filter cavity forming a filtered side, said annular body engaging and being sealed in an annular gap when said filter element is inserted, said annular gap being formed on said element seat of said filter housing and being in fluid communication with said return chamber.

7. A filter device according to claim 6 wherein said annular gap is delimited on an inside thereof by an annular rib of said element seat surrounding a tubular body at a radial distance and on an outside thereof by a tube connection projecting from said element seat, an outer side of said tube connection abutting said unfiltered side, a passage from said unfiltered side to said outlet chamber being unblocked for fluid overflowing said tube connection when said filter element is removed from said filter housing.

8. A filter device according to claim 7 wherein said annular body and said annular gap are sealed by a sealing element on at least one of an inner or outer side of said annular body or said annular rib or an inner side of said tube connection.

9. A filter device according to claim 1 wherein a barrier device is in said filter housing between said outlet chamber and said inner filter cavity of said filter element, said barrier device allowing an influx of fluid into said outlet chamber only upon a predetermined filling level being reachable in said filter housing by an overflowing of said barrier device.

10. A filter device according to claim 9 wherein said barrier device comprises a tubular body projecting from said element seat into said inner filter cavity of said filter element up to a height of the predetermined filling level and being connected inside said element seat said outlet chamber.

11. A filter device according to claim 1 wherein said inner control part comprises a flange extending radially relative to a longitudinal axis of said equalizing tube, said through-hole providing a narrowing in a passage in said equalizing tube in a direction from said top end to said bottom end of said equalizing tube.

* * * * *